United States Patent

[11] 3,607,066

| [72] | Inventors | Andreas Basch<br>Frankfurt, Niedereschbach;<br>Hans Hermann von Döhren, Frankfurt am<br>Main, both of Germany |
|---|---|---|
| [21] | Appl. No. | 576,008 |
| [22] | Filed | Aug. 30, 1966 |
| [45] | Patented | Sept. 21, 1971 |
| [73] | Assignee | Varta Aktiengesellschaft<br>Frankfurt am Main, Germany |

[54] PROCESS FOR THE PRODUCTION OF HYDROGEN AND OXYGEN GASES
14 Claims, 4 Drawing Figs.

[52] U.S. Cl. .................................................. 23/212,
23/221, 23/281
[51] Int. Cl. .............................................. C01b 1/02,
C01b 1/27, C01b 13/02
[50] Field of Search........................................... 23/212,
221, 2, 1

[56] References Cited
UNITED STATES PATENTS

| 1,528,099 | 3/1925 | Crommett | 23/212 |
|---|---|---|---|
| 1,817,726 | 8/1931 | Vinther | 23/212 |
| 2,421,381 | 6/1947 | Jenness | 23/221 |
| 2,558,756 | 7/1951 | Jackson et al | 23/221 X |
| 2,627,454 | 2/1953 | Tschinkel | 23/221 X |
| 2,721,788 | 10/1955 | Schad | 23/221 X |
| 2,794,709 | 6/1957 | Kirkbride | 23/212 X |
| 2,865,721 | 12/1958 | Lane et al. | 23/221 X |
| 2,988,430 | 6/1961 | Horner | 23/212 X |
| 3,025,145 | 3/1962 | Terpenning, Jr. | 23/212 X |
| 3,081,268 | 3/1963 | Marshall, Jr. | 23/212 X |
| 3,276,846 | 10/1966 | Moni et al. | 23/221 X |
| 3,278,452 | 10/1966 | Vorum | 23/212 X |
| 3,290,406 | 12/1966 | Pfefferle | 23/212 X |
| 3,306,706 | 2/1967 | Schuman | 23/212 |
| 3,338,681 | 8/1967 | Kordesch | 23/212 X |
| 3,350,176 | 10/1967 | Green et al. | 23/212 X |
| 3,351,564 | 11/1967 | Faatz, Jr. et al. | 23/212 X |
| 3,388,074 | 6/1968 | Reitmeier | 23/212 X |
| 3,396,124 | 8/1968 | Taylor et al. | 23/212 X |
| 3,421,871 | 1/1969 | Davies | 23/212 X |
| 2,304,138 | 12/1942 | Barnes et al. | 23/288 X |
| 3,259,523 | 7/1966 | Faris, Jr. et al. | 23/212 X |
| 3,278,268 | 10/1966 | Pfefferle, Jr. | 23/212 |
| 3,450,567 | 6/1969 | Sederquist et al. | 23/212 X |
| 3,469,944 | 9/1969 | Bocard et al. | 23/212 |

Primary Examiner—Edward Stern
Attorneys—Erich M. Radde, Charles A. McClure, Gerard J. Weiser and Alfred Stapler ABSTRACT: A process and apparatus for the simultaneous production of hydrogen and oxygen gases in which an oxygen generating compound is catalytically decomposed, the oxygen is separated and concurrently therewith a hydrogen generating compound is catalytically decomposed by means of the heat generated by the decomposition of the oxygen generating compound.

INVENTORS
ANDREAS BASCH
HANS von DOEHREN

PROCESS FOR THE PRODUCTION OF HYDROGEN AND OXYGEN GASES

The present invention relates to a process and to an apparatus for the simultaneous production of hydrogen and oxygen gas, especially for the use in electrochemical fuel cells and fuel cell batteries.

Both hydrogen and oxygen can be simultaneously produced by the electrolysis of water. However, this process requires considerable amounts of electrical energy, which cannot be fully recovered in the electrochemical reaction of these gases in a fuel cell battery. This fact and the limitation that the electrolysis of water can be carried out only at locations where electricity is available place a serious limitation on the usefulness of water electrolysis for the above stated purposes.

It is also known to produce oxygen gas by catalytic decomposition of peroxides or other peroxy compounds. Important in this respect is particularly the decomposition of hydrogen peroxide and of its aqueous solutions. It is also known to produce hydrogen gas by the decomposition or conversion of hydrogen-containing compounds. In accordance with one proposal, hydrogen gas can be readily produced, with the use of suitable catalysts, from mixtures of methanol and water or steam, respectively, at temperatures in the range from 350° C. to 420° C. and at atmospheric or slightly elevated pressures. The gas mixture produced in this reaction comprises primarily hydrogen. Purified hydrogen can be readily recovered therefrom, and separated from the impurities, such as carbon dioxide, water vapor and other gases, by the use of such materials which are selectively permeable to hydrogen and which are not permeable to the other components of the gas mixture or which absorb the undesired components of the gas mixture.

Because of the principal differences in the conditions for the production of oxygen gas and hydrogen gas by above just described methods or by other similar methods, separate apparatus has been used in the past for each of these reactions when both oxygen and hydrogen were needed at the same time, each apparatus being independent and physically separated from the other. Aside from the considerable space requirement of independent apparatus for the two reactions, the prior art operation is also uneconomical from the point of view of heat energy.

It is therefore an object of the present invention to provide a process for the simultaneous production of hydrogen and oxygen gas in a simplified and more economical manner.

It is another object of the invention to provide new apparatus which is adapted for the carrying out of the combined process for the generation of hydrogen and oxygen gas in a single operation in an apparatus which requires less space than the apparatus of the prior art.

Another object of the invention is the provision of an integrated apparatus which comprises the means for the simultaneous, continuous production of gaseous hydrogen and oxygen in a more economical manner than was possible herebefore.

It is an object and the invention so provides a method for adiabatic production of the two gases concurrently.

Other objects will become apparent as the description of the the invention proceeds.

The invention provides a process which comprises catalytically liberating oxygen from an oxygen-containing material and concurrently therewith liberating hydrogen from a hydrogen-containing material wherein the hydrogen liberation is effectuated under the heat generated by the liberation of the oxygen. In the process the heat energy liberated in the decomposition of oxygen-containing compound, hereinafter referred to as peroxy compound, is directly utilized for heating the hydrogen-containing compound. The decomposition of the peroxide or other peroxy compound liberates gaseous oxygen, which may be used together with the hydrogen obtained for the operation of fuel cell batteries or other equipment where oxygen and hydrogen are needed.

In the process, the hydrogen-containing compound is contained in suitable means which are in thermal transfer relationship with the peroxy compound converting means. Preferably the peroxy converter is situated within the physical confines of the hydrogen compound decomposition means.

The ratio of the hydrogen and oxygen gases produced by the process and in the apparatus of the invention can be readily adjusted to correspond to that needed for the operation of said equipment or fuel cell battery so that the new process recommends itself especially for the operation of a variety of equipment.

The objects of the invention are furthermore achieved by an apparatus which comprises a decomposition chamber for peroxy compounds and in heat exchanging relationship therewith a converter for the decomposition or conversion of the hydrogen-containing compound and, if desired, other equipment or device for the generation and recovery of the hydrogen. The said converter, and if applicable, said other equipment may be contained within the said decomposition chamber, or if desired, it may be arranged in immediate vicinity thereto with the provision of means adapted to provide for the heat exchange between the interior of said decomposition chamber and said converter, and if applicable, said other hydrogen generating and recovery equipment.

The invention will be more readily understood in conjunction with the attached drawings, in which FIG. 1 is a diagrammatic representation of an integrated apparatus in which the converter is arranged within the decomposition chamber for the peroxy compound and in which the generated hydrogen and oxygen are directly fed to a fuel cell battery.

Figure 1:
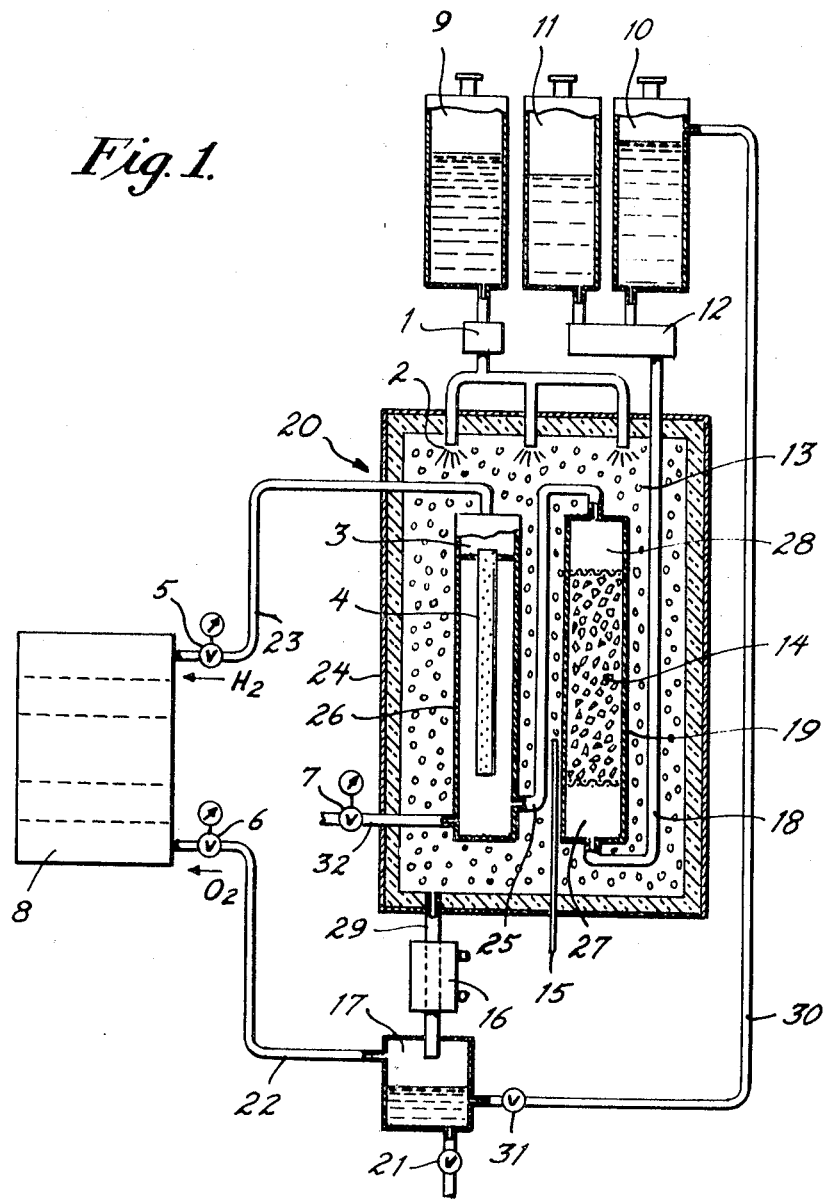

The process of the present invention permits the generation of hydrogen gas by the conversion of hydrogen-containing compounds, such as aliphatic hydrocarbons, alcohols, ammonia or the like, in which process the heat energy required for the preheating and decomposition of the said hydrogen-containing compounds is at least in part provided by the heat generated the catalytic decomposition of peroxides or other peroxy compounds. In the preferred embodiment of the process there is employed as the hydrogen-containing compound an aqueous solution comprising an alkanol as of 2 to 12 carbon atoms, typified by methanol, octanol, pentanol, etc. In another embodiment there is used a liquid hydrocarbon of the general formula $C_nH_{2n+2}$, for example having 5 to 16 carbon atoms, typified by hexane, octane, decane, and paraffinic mixtures. Advantageously, a hydrogen-releasing compound is selected which is miscible or soluble in water. Most advantageously, at least part of the required heat energy is provided by the catalytic decomposition of hydrogen peroxide or of a concentrated solution of hydrogen peroxide in water.

It is of particular advantage to imbed the device and equipment for the evaporation and conversion of the hydrogen-containing compound or compounds directly in the catalyst at which the peroxide is decomposed, so that the heat energy liberated is directly conducted to the said evaporation and conversion equipment. It is thereby of advantage to deliver the peroxide by suitable distribution system preferentially in the vicinity of the heat conducting walls of the evaporation and conversion equipment for the hydrogen-containing compounds, where the peroxide is decomposed with the generation of heat. If desired, nozzles for the injection of the peroxy compounds or their solutions may be provided at and within the catalyst, preferably in a distribution which provides the maximum of heat output at or near the equipment to be heated.

In a most preferred embodiment of the process of the invention, solely the heat energy liberated in the catalytic decomposition of hydrogen peroxide is directly used to evaporate a mixture of about equimolar amounts of methanol and water, react or convert said mixture at a temperature ranging from about 250° C. to 500° C. in the presence of a suitable hydrogen-releasing catalyst. The hydrogen can be recovered by contacting the gaseous mixture thus obtained and comprising primarily hydrogen, at elevated temperatures with a solid material which is selectively permeable to hydrogen and impermeable to carbon dioxide.

In the process of the present invention both the hydrogen gas and the oxygen gas are delivered separately from each other and may be directly used for continuously feeding them to the equipment where the gases are utilized.

In order to avoid the need for additional heating by an external source of heat, expediently such hydrogen-containing compounds are selected and used in the process of the invention which can be converted at relatively low temperatures. The choice of the most favorable catalysts is of assistance in this respect. It is also preferred to utilize such peroxy compounds which liberate in their decomposition a quantity of heat energy which is sufficient for carrying out the thermal decomposition of the selected hydrogen-containing compound. Of course, the foregoing considerations should take into account the ratio or relative amounts of the hydrogen and oxygen delivering compounds used in the combined reaction.

It was found that alkanols such as methanol or liquid aliphatic hydrocarbons such as hexane, octane on one hand, and hydrogen peroxide on the other hand (highly concentrated aqueous solutions of these compounds), are very well suited as reactants in the process of the present invention.

Depending on the circumstances, other oxygen releasing compounds may be used as a source of heat and the oxygen gas. Among these are inorganic and organic peroxyhydrates, persulfates, peroxydiphosphates, peroxydisulfates, permanganates, perchlorates, periodates, perchromates; chlorates, iodates, bromates, and nitrates in their hydrogen, or acid form, or in the form of their alkali metal, alkaline earth metal or ammonium salts. Individual acids, in their hydrogen form; alkali metal, such as sodium, lithium, and potassium; alkaline earth metal, such as calcium, barium, magnesium, and strotium, and ammonium forms of each of the above groups of oxygen-providing compounds may be used, also sodium borate peroxyhydrate, urea peroxyhydrate, peroxydisulfuric acid, peroxyphosphoric acid, and the like, or the salts of these compounds and the organic peroxides such as alkylhydroperoxides, peroxyesters such as tertiary butyl peroxybenzoate, organic peroxy acids such as peroxyacetic acid or peroxybenzoic acid; diacylperoxides such as diacetyl peroxide or dibenzoyl peroxide and peroxide derivatives of ketones and aldehydes such as cyclohexanone peroxide, nitrobenzene, and the like are suitable for oxygen and heat releasing compounds. Alkaliperoxides may beneficially be used as the reactant for the oxygen generation; generally it is preferred and most advantageous to use as the peroxy compound hydrogen peroxide or a concentrated aqueous solution of this compound.

As will be readily apparent, the above mentioned compounds will be preferably used in conjunction with a suitable inert solvent. Generally, those peroxy compounds which are soluble in water, such as the inorganic peroxy acids or their salts are greatly preferred because of the greater convenience in the operation of the process.

The more preferred hydrogen-containing compound for the generation of hydrogen in the process of the present invention is methanol. If desired, other hydrogen-containing compounds such as aliphatic hydrocarbons; lower alkanols such as ethanol or propanol; or ammonia or its derivatives, formaldehyde or hydrazine and the like may be used.

A large number of catalysts are well suited for the decomposition of the hydrogen-containing compounds and of the peroxy compounds used in the process of the present invention. Numerous catalysts which are useful for the decomposition of methanol to produce hydrogen gas in accordance with the process of the present invention are listed and described in "Catalysis" by Sophia Berkman, J. C. Morrell and G. Egloff, published by Reinhold Publishing Corp. 1940 and especially in the reprint (1946) of this work on pages 744 to 747. Numerous catalysts which can be used with advantage for the decomposition of the peroxides and other peroxy compounds with the generation of gaseous oxygen in accordance with the process of the present invention are listed and described on pages 703 to 707 of the above-mentioned publication. Said publication is incorporated herein by reference.

The preferred catalyst for the decomposition or conversion of methanol or methanol-water mixtures, respectively, is nickel chromite or copper chromite. The decomposition of hydrogen peroxide is most preferably effected with a catalyst which comprises $MnO_2$ deposited on a suitable carrier, preferably on kieselguhr.

As is apparent from the foregoing, the most preferred embodiment of the process of the present invention comprises catalytically decomposing an oxygen-containing compound to liberate oxygen gas and heating a hydrogen-containing compound or mixture of such compounds by help of the heat energy liberated in the decomposition of the oxygen-containing compound, reacting and decomposing or converting the hydrogen-containing compound in the presence of a suitable catalyst, if necessary with the provision of additional external heat, with the formation of gaseous hydrogen, and subsequently separating the hydrogen from the remaining reaction products.

As stated hereinbefore, the heat energy liberated in the decomposition of hydrogen peroxide is sufficient for converting a solution containing one mole of methanol for each mole of water, or its equivalent, the heating of the generated vapors to a temperature ranging between about 350° C. and 450° C., the conversion over the catalyst, and if desired, or necessary, for the heating of the device, required for the separation of the hydrogen gas from the resultant gaseous mixture to the elevated temperature at which the separation takes place.

When the gaseous hydrogen and oxygen are used, in accordance with the preferred embodiment of the process of the invention, for the operation of fuel cells, fuel cell batteries or for welding equipment, the quantity of hydrogen peroxide need be only large enough to generate one mole of oxygen for each two moles of hydrogen.

The preferred embodiment of the apparatus of the present invention for carrying out the hereinbefore described process comprises advantageously the reaction vessels for the evaporation and conversion of the hydrogen-containing compounds and for the purification of the resultant hydrogen disposed in the space in which the peroxide is decomposed. Desirably, the catalyst required for the decomposition of the peroxide or other peroxy compound is arranged in such manner, that as much as possible of the heat energy liberated in the decomposition of the peroxide or other peroxy compound is conducted to the walls of the individual reaction vessels contained in the apparatus. This can be achieved to a high degree by the provision of the internal reaction vessels with heat conducting projecting ribs, hereinafter called fins, which project into the peroxide decomposition catalyst. If the fins are extended out to and in contact with the interior surfaces of the walls of the peroxy decomposition chamber, also the heat energy liberated in the outer areas can be utilized for the conversion of the hydrogen-containing compounds.

Further improvement in the utilization of the heat energy provided by the decomposition of the peroxy compounds can be achieved, if heat conducting surfaces are provided on outer and/or inner walls of the various components of the composite apparatus, for instance in form of ribs. In the most preferred embodiment of the apparatus, heat conducting fins are connected to the interior wall areas of the chamber in which the peroxy is catalytically decomposed. This arrangement provides, besides the improved heat transfer and more complete utilization of heat energy, the advantage that the internal reaction vessels are fixedly suspended in relation to the peroxy decomposition chamber.

A still greater portion of the heat energy liberated in the peroxide or peroxy compound decomposition can be utilized for the hydrogen generation if the main chamber is well insulated, e.g., by the provision of an insulating layer all around the chamber.

The principles of the construction of the composite apparatus and of the arrangement of the components and elements relative to each other are illustrated diagrammatically in FIG. 1 of the attached drawings. The composite apparatus 20 comprises decomposition chamber 24 for the peroxy compounds in which chamber are disposed reaction vessel or converter 19 with tube 18 connecting to the bottom of converter 19. The top end of the latter is connected by tubing 25 to the lower portion of the hydrogen diffusion device 26. The top end of the latter connects over tubing 23 and over the hydrogen pressure control valve 5 to fuel gas inlet of a fuel cell battery 8 (shown schematically). Chamber 24 is filled with the peroxy decomposition catalyst 13, which surrounds and is in contact with the internal components 18, 19, 25 and 26. Converter 19 for the hydrogen-containing compound is filled with catalyst 14 for the conversion of the hydrogen-containing compound, leaving free spaces 27 and 28 at the bottom and top of the converter by means of suitable perforated supports, such as screens.

Above decomposition chamber 24 are disposed storage container 9 for peroxy compound and storage container 11 for hydrogen-containing compound and storage container 10 for water, if the latter is to be used as a diluent or additive to the hydrogen-containing compound, or for any desired suitable diluent or solvent. Both storage containers 10 and 11 are connected by tubing provided communicatively at their bottom ends with mixing chamber 12 which connects into tubing 18. Storage container 9 is connected over control and measuring device 1 to distributor 2 for the peroxy compound, the openings of which distributor are disposed in decomposition chamber 24. It is thereby of advantage to arrange the openings of distributor 2 over the various parts of chamber 24 so that the peroxy compound is distributed and released for contact with the catalyst preferentially in those parts of the chamber where the heat generated in the decomposition is best utilized for the heating of the hydrogen-containing compound in the hydrogen generating equipment.

At the bottom of decomposition chamber 24 there is provided outlet tubing 29 with condenser 16 which leads into water collecting container 17, with drainage valve 21 at the bottom and gas line 22 for the oxygen gas, which line connects over reducing and control valve 6 into the oxidant gas inlet of fuel cell battery 8. Optionally, line 30 is provided, connecting the lower portion of water collecting container 17 over suitable forwarding means, such as a pump (not shown) to the water storage container 10. In chamber 24 is also provided thermoelement 15 for measuring the reaction temperature in the decomposition chamber.

Hydrogen diffusion device 26 comprises tube 4, which is made from a material which is selectively permeable to hydrogen but not to the other components of the reaction gas mixture obtained in the decomposition of the hydrogen-containing compound. Tube 4 is closed all around and at the bottom and is open at the top connecting into chamber 3 which leads into tubing 23 which connects over a cooling device (not shown) to the fuel electrodes of fuel cell battery 8. At the bottom portion of diffusion device 26 is provided a tube 32 with valve 7 for the removal of the undesired gaseous byproducts.

For the operation of the composite apparatus, the peroxy compound is taken in measured quantities from storage container 9 and distributed by distributor 2 over the catalyst 13, where it reacts with decomposition and with the formation of oxygen gas. The cooled oxygen gas is led over line 22 and supplied in measured quantities to the fuel cell battery. The hydrogen-containing compound is taken from storage container 11 and led through tubing 18 into converter 19. It is thereby preheated, while passing through tube 18 and has the desired reaction temperature, when it is contacted with the heated catalyst 14 in the converter. The gas mixture containing hydrogen obtained in the reaction is forwarded through line 25 to diffusion device 26 where the hydrogen gas diffuses through tube 4, collects in chamber 3 and passes on through tube 23, if necessary, after cooling in a cooler (not shown) from where it is supplied in measured quantities to the fuel electrodes of fuel cell battery 8. The gaseous byproducts, which do not pass through tube 4, are taken out through tubing 32 and over valve 7.

In a specific example, the apparatus is operated with aqueous hydrogen peroxide (85 percent $H_2O_2$) as the peroxy compound and with methanol as the hydrogen-containing compound. The hydrogen peroxide is distributed over and in contact with catalyst 13, manganese oxide, as described hereinbefore, where it decomposes to form oxygen gas and water with the release of the heat energy required for the conversion of the methanol. In order to obtain the maximum amount of hydrogen and to react the toxic carbon monoxide to form carbon dioxide, it is desirable that the methanol taken from storage container 11 be mixed, in mixing chamber 12, with the required amount of water taken from storage container 10. For each part by weight of carbon monoxide formed in the decomposition of the methanol there are required 0.64 part by weight of water. If desired, an excess of water may be employed depending on the temperature and pressure at which the reaction is carried out. Generally, the amount of water may be increased to about 0.85 part by weight for each part by weight of carbon monoxide and in some cases to even higher amounts. Desirably water is used in excess varying from about 10 to 300 weight percent of the hydrogen-releasing compound.

The water in storage container 10 can be replenished, if desired, by returning the water collecting in container 17 from the condensation of the water vapor formed in the decomposition of the hydrogen peroxide, to container 10 through tubing 30 by gravity or by use of pumps or the like, as the case may be. In the place of water other suitable solvents or diluents may be used.

The methanol water mixture flows into preheater tube 18, where it is vaporized and from where it enters converter 19. There the methanol is catalytically reacted in the presence of catalyst 14, to yield a gas mixture containing hydrogen. The gas mixture formed in the converter is then passed on to diffusion device 26, where the hydrogen passes through tube 4 and is led on to the fuel cell battery as described hereinbefore.

The apparatus is preferably dimensioned and designed such that the temperature in the decomposition chamber 24 ranges between about 250° C. and 480° C. at the desired rate of decomposition of the hydrogen peroxide, peroxide, other peroxy compound. Catalyst 13 used in decomposition chamber 24 for the decomposition of the hydrogen peroxide is preferably $MnO_2$ catalyst deposited on a suitable inert carrier such as kieselguhr. Catalyst 14 for the conversion of the methanol water mixture is preferably nickel chromite or copper chromite.

The temperature of decomposition may reach about 80° C. to 1,000° C. or even higher depending on the particular peroxy compound and catalyst used and the desired speed of reaction desired. Conveniently the temperature may range from about 100° C. to 600° C. Pressures may range from atmospheric to about 12 atm., or even higher if desired.

Figure 2:
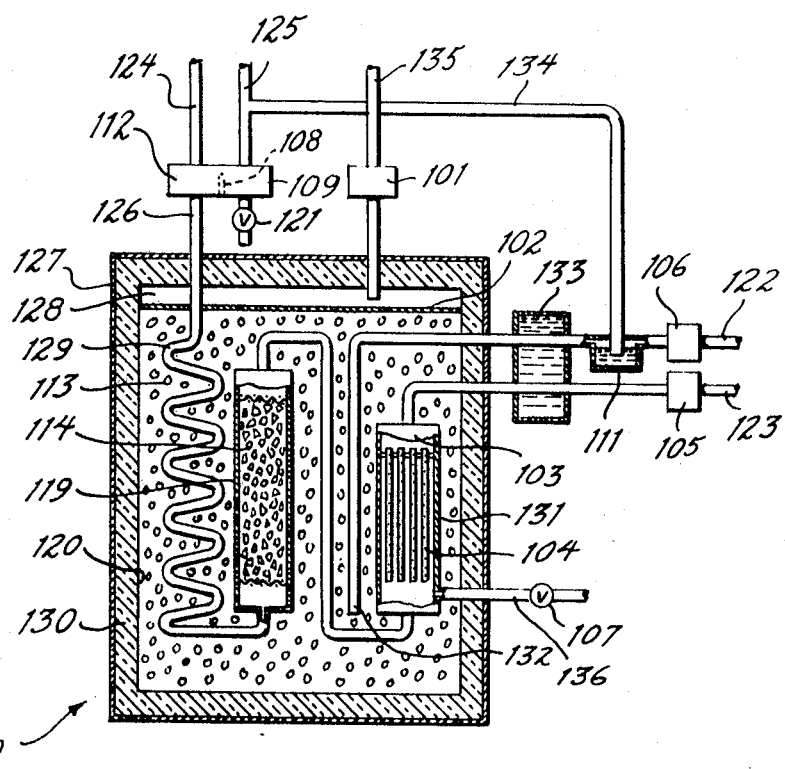
FIG. 2 is a schematic representation of an integrated apparatus of the present invention with an optimum utilization of space for compactness of the apparatus.
Figure 3:
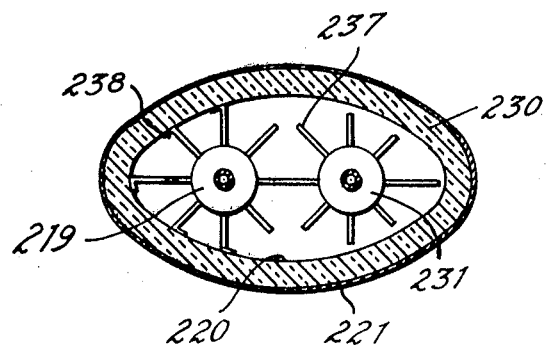
FIG. 3 is another diagrammatic representation of an apparatus of the invention modified for combustion of the residual gas mixture.

Another embodiment of the composite apparatus of the present invention is illustrated in FIG. 2 of the attached drawings as generally designated by 100. The peroxide decomposition chamber 120 is covered with and surrounded by an insulating layer 130. This layer is made from an insulator which is capable of withstanding the reaction temperatures prevailing in the apparatus. "Aerosil," silicate, $SiO_2$, finally distributed, can be used with particular advantage in the apparatus of the present invention. Insulating layer 130 is preferably contained in and protected by an outer layer 127 which is preferably made from corrosion and temperature resistant materials, such as stainless steel.

The peroxy compound hydrogen peroxide (85 percent $H_2O_2$) is introduced over tube 135 and measuring device 101 into upper space 128 of decomposition chamber 120, where it is distributed over horizontal, perforated drip plate 102. The perforations in plate 102 are arranged and sized so that the peroxy compound is preferentially distributed and contacted with those portions of catalyst bed 113 which adjoin the parts of the equipment used for the conversion of the hydrogen-containing compounds, viz., converter 119, vaporizer 129 and diffuser 131. Plate 102 is made from a material which is corrosion resistant at elevated temperatures, and is made preferably from an austenitic steel.

The hydrogen-containing compound is introduced over tubing 124, from where it passes into mixing and measuring chamber 112, which latter is connected over barrier 108 with an adjoining chamber 109. The latter is supplied with water which is introduced in measured quantities through tubing 125 from a water storage container (not shown) or through tubing 134 from a container 111 wherein the water condensed at condenser 133 collects. Any excess of reaction water may be disposed over valve 121.

The mixture of the hydrogen-containing compound, such as methanol and water, flows through tubing 126 into the spirally shaped evaporator tube 129, from where it passes to converter 119 which contains catalyst 114. There the vaporized methanol is catalytically reacted on the nickel chromite catalyst to yield a gas mixture containing hydrogen. The hydrogen-containing reaction gas mixture passes on to diffuser 131. The latter comprises a large number of parallel arranged tubes 104, which are made from a material which is selectively permeable to hydrogen and not permeable to the other components of the gas mixture. The extensive surface areas of these tubes allows for a considerably higher volume of hydrogen to pass and thus provides for the recovery of larger quantities of hydrogen per time unit at a given temperature than is possible in the single tube diffuser shown in FIG. 1. On the other hand, the provision of a large diffusion surface area makes it possible to operate the diffuser also at a lower temperature than that of FIG. 1 without reducing the total volume of hydrogen passing through as compared with the arrangement in FIG. 1 when operated at higher temperatures. The residual gases, i.e., the gases which do not pass through tubes 104 are removed over line 136 and valve 107. The hydrogen collects in chamber 103, from where it passes over condenser 133 and reducing valve 105 to be discharged through line 123 to the place of storage or consumption, e.g., to the fuel gas inlet of a fuel cell battery.

The residual gases may include nitrogen, oxides of nitrogen, carbon monoxide, carbon dioxide, water vapor and others depending on the nature of the hydrogen-containing compound selected.

The peroxy compound passes through the above mentioned perforations in drip plate 102 into contact with decomposition catalyst 113. Using hydrogen peroxide as the peroxy compound, a mixture of steam and oxygen gas is obtained, which is removed from the interior of decomposition chamber 120 through tube 132 and passed through condenser 133 and over reducing valve 106 to be discharged through line 122 to a fuel cell battery of autogenous welding equipment or to other places of use. The water, condensing in condenser 133, is collected in container 111, from where it may be returned to chamber 109.

Using an about equimolar methanol-water mixture and 85 percent aqueous hydrogen peroxide as the reactants, hydrogen gas and oxygen gas in a ratio by volume of 2 to 1 were produced in the above-described apparatus. The reaction was carried out at about 350° C. and at a slightly elevated pressure, using nickel chromite as the catalyst for the hydrogen generation and an $MnO_2$ catalyst, deposited on kieselguhr, for the oxygen generation.

The apparatus of the invention may also be connected with a fuel cell to give a combined system as follows. The supply of such a fuel cell battery, having an electrical output of 1 Kwhr and a voltage at the terminals of 0.75 volt requires about 600 liters of hydrogen at std. temperature and pressure. In the case of a hydrogen diffuser having an efficiency of about 60 percent the production of 1,000 liters hydrogen at 400° C. requires in accordance with the equation

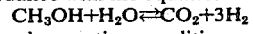
$$CH_3OH + H_2O \rightleftharpoons CO_2 + 3H_2$$

at the above stated operating conditions an amount of heat corresponding to about 541.7 Kcal., this including the heat necessary for the evaporation of the used methanol and water. This is obtained from the conversion of 477 g. of methanol and 330 g. of water. Water is used desirably in an excess of 20 to 25 weight percent. Conversion is carried out at 400° C. and a pressure of 10 atmospheres.

The catalyst used is nickel. In another run there was used copper chromite. The corresponding amount of oxygen, 300 liters at std. temperature and pressure per hour, was obtained by the catalytic decomposition of 1.071 g. of an 85 percent aqueous hydrogen peroxide solution, with the liberation of about 621 Kcal. of heat, this being adequate for the conversion of the methanol.

The thermobalance in a run using methanol and hydrogen peroxide (producing 600 liters of hydrogen and 300 liters of oxygen) is as follows, in Kcal.:

Heat requirements:
Hydrogen generation        176.2
Vaporization of methanol at 140° C. and 10 atmospheres
   91.5
Heating of methanol from 140° C. to 400° C.    70.6
Vaporization of water at 140° C. and 10 atmospheres
   155.6
Heating of water vapor from 140° C. to 400° C.   47.8
Total Heat requirements    541.7
Thermal energy released from:
Conversion of $H_2O_2$ to oxygen (85 percent $H_2O_2$)    621
Combustion of the hydrogen residue in the gas mixture
   1,219
Total energy release    1,840

As is evident the energy released from the conversion of the oxygen-releasing compound is in excess of that required for the conversion of the hydrogen-releasing compound to hydrogen (including related heat requirements). The heat from the combustion of the hydrogen in the gas mixture may be used in other operations where combustible gases are desired, or the gas may be used in part or all of it as shown in the process to preheat and vaporize the hydrogen-releasing compound (aqueous mixture or in suitable solvent).

The arrangement of converter and of diffuser, in the decomposition chamber for the hydrogen peroxide or equivalent peroxy compound thus provides in accordance with the invention a full utilization of the heat energy for the generation and recovery of the hydrogen without external heating for the continuous adiabatic operation of the process in the above described manner.

Figure 4:
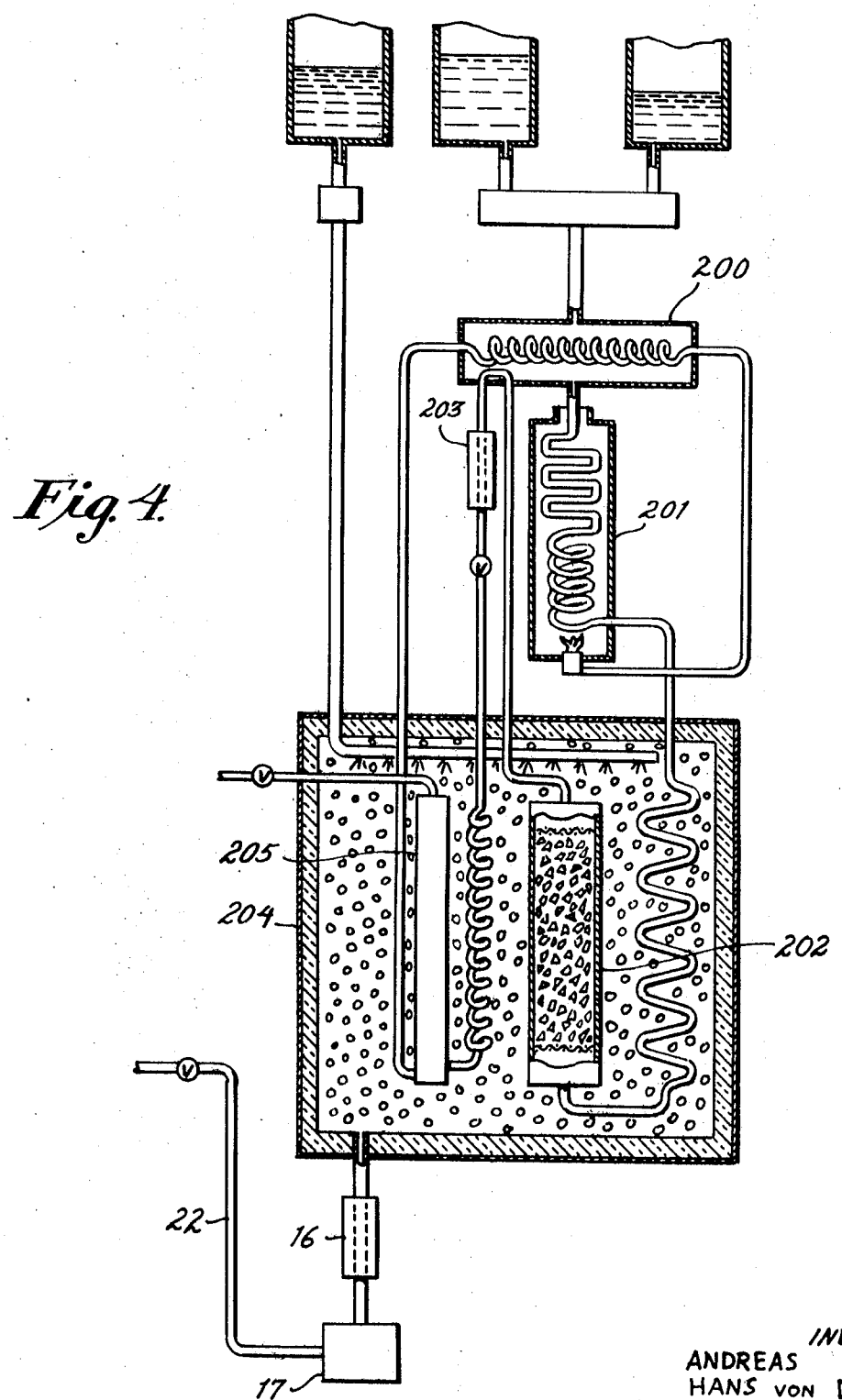
FIG. 4 is a simplified schematic representation, in horizontal section, of another embodiment of the composite apparatus, in which the converter and the hydrogen purification equipment are contained within the decomposition chamber for the peroxy compound and are provided with fins for further improvement in heat exchange.

Yet another embodiment of the composite apparatus of the present invention is illustrated in FIG. 4 of the attached drawings. To produce 1,000 liters of hydrogen per hour (at standard conditions), the apparatus is supplied with 477 g. of methanol and 330 g. of water theoretical requirement 267 g.) per hour under a pressure of 10 atmospheres. The mixture is then preheated in heat exchanger 200° C. to 140° C., then the vapors fed to heating chamber 201 where they are heated to 400° C. The aqueous methanol vapors are then fed directly to catalytic reactor chamber 202, where they are decomposed according to general formula $CH_3OH + H_2O \rightleftharpoons 3H_2 + CO_2$. The crude reaction gas mixture is freed of unreacted excess water by passage through condenser 203, then after reheating to 300° C. within decomposition chamber 204 it is fed into a platinum-silver diffuser 205 for selective separation of the hydrogen. At a temperature of 300° C. and a pressure of 10 atmospheres, the diffuser, operating at 60 percent efficiency, liberates 600 liters of hydrogen gas which is fed to a fuel cell battery. The remaining 400 liters in the gas is passed through heat exchanger 200, there releasing its heat for heating the feed of methanol and water, then the gas is burned to heat heating chamber 201. The use of the residual hydrogen in the gas residue to provide the heat to vaporize the hydrogen-containing compound maximizes the efficiency of the apparatus of the invention. If desired, the energy obtainable from the burning of the hydrogen can also be utilized for different purposes.

For the production of the 300 liter stoichiometric amounts of oxygen (at std. conditions), there are decomposed catalytically 1,071 g. of aqueous (85 percent $H_2O_2$) hydrogen peroxide. The 621 Kcal. of energy released by the decomposition of the methanol is already sufficient to prevaporize the water. To this heat there is also added that obtained from the combustion of the hydrogen in the residual gas, as described above. The hydrogen peroxide is catalytically decomposed in chamber 204, gases pass in condenser 16 and water is separated at 17, and oxygen gas is collected at outlet 22. It can be fed to a fuel cell battery.

In a similar manner the process is carried out using hexane, as the hydrogen-releasing compound to give hydrogen according to the general formula $C_6H_{14}+12H_2O \rightleftarrows 19 H_2+6CO_2$ wherein water is used in excess (about 100 to 300 percent excess) to minimize soot formation. In an embodiment of the process, to produce 1,000 liters of hydrogen a feed of 202.2 g. of n-hexane and 1,500 g. (theoretical 507.2 g.) of water is used. The hydrogen peroxide (85 percent) feed is 1,071 g. The thermobalance in the process using n-hexane is as follows, in Kcal.:

Heat requirements for:
Hydrogen generation      397.5
Vaporization of water at 140° C. and 10 atmospheres   717
Heating of water vapor from 140° C. to 650° C.   579.2
Vaporization of n-hexane at 140° C. and 10 atmospheres   12.3
Heating of n-hexane vapor from 140° C. to 650° C.,   41.5
Total heat requirement      1,747.5
Thermal energy released from:
Conversion of $H_2O_2$ to oxygen (85 percent $H_2O_2$)   621
Combustion of the hydrogen residue in the gas mixture   1,219
Total energy release 1,840

The excess 92.5 Kcal. is adequate to compensate for heat loss from the apparatus.

As is evident from the teaching disclosed herein by the selection of the desired oxygen-releasing compound, by catalytic decomposition, the requisite energy is obtained to provide for the generation of hydrogen, by catalytic decomposition of the hydrogen-releasing compound and for related heat requirements. By suitable selection of the oxygen and heat releasing compound for a corresponding hydrogen-releasing compound, the process operates under optimum efficiency.

If for any consideration, especially for thermodynamic or space reasons, it is not desired to place the converter for the hydrogen-containing compound into the interior confines of the peroxy decomposition chamber, it is possible to arrange the peroxy converter, in accordance with the present invention, outside of the decomposition chamber.

It is then, however, desirable, that the converter be arranged directly adjacent to this chamber, without heat insulation between these parts of the composite equipment. In this special case, a system of heat exchange tubing is arranged in the decomposition chamber and in thermal communication with the converter. The heat exchange tubing may contain a high boiling liquid which acts as a carrier for the heat and which directly circumflows the converter imparting thereto the necessary heat. If desired, said high boiling liquid may be further heated by a customary heating device to the temperature required by the decomposition reaction of the hydrogen-containing compound or compounds.

Accordingly, the present invention comprises also integrated equipment of the type and purpose described, in which the hydrogen generating equipment are disposed outside the decomposition chamber for the peroxy compound and wherein the heat exchange between the exothermic peroxy decomposition and the endothermic conversion of the hydrogen-containing compound is achieved by a system of thermal connection and exchange connecting both parts of the equipment in which these reactions are carried out. The liquid heat exchanging medium which may be used, such as high boiling organic liquids or an alloy of metals melting at or below the reaction temperatures encountered in the apparatus, is circulated in the said heat exchange means from the interior of the decomposition chamber into direct contact with the outside walls of said hydrogen generating equipment or, if desired, to the interior of the converter and, if desired, of the other hydrogen generating equipment. The heat exchange liquid is preferably circulated by suitable forwarding means such as pumps or by gravity flow. If desired, additional amounts of heat may be supplied in this embodiment of the apparatus by the use of suitable external heat sources.

For the separation of the hydrogen from the reaction gas mixture there is used a diffuser containing such metals which are selectively permeable for hydrogen, such as palladium alloys. It is advantageous to supply the diffusion equipment with heat from the decomposition chamber as is described above by placing the diffusing means in thermal connection with the decomposition chamber. Presently, best results are achieved with tubes which comprise a palladium-silver alloy. Alloys containing about 70–77 percent palladium, and especially palladium alloys which contain about 23–30 percent silver are particularly suited. Tubes from palladium or palladium alloys containing smaller amounts of the alloying metal may also be used under special circumstances.

When the reaction gas mixture resulting from the decomposition of the hydrogen-containing compounds and especially from methanol water mixtures contains principally carbon dioxide with the hydrogen, the latter may also be separated by the direct removal of the carbon dioxide. This may be achieved by the use of the so-called molecular sieves, such as zeolith, in a known manner. The various types of zeoliths take up between 14 and 18 percent of their weight of carbon dioxide, depending on their composition and the operating conditions. They can be simply regenerated by blowing dried air through the loaded zeolith. In this aspect of the invention, no special diffusion equipment is needed and since the charging of the zeolith takes place at room temperature, it is in this case not necessary to make provision for the heating of the purifying equipment of this type.

The use of molecular sieves for the purification of the hydrogen is recommended especially in those instances, where the converted gas mixture contains besides the large amounts of or predominantly hydrogen and impurities of inert gases, including water vapor, only larger amounts of carbon dioxide. In practice with this embodiment of the invention there is used preferably the so-called two-chamber system, which permit the loading of one part of the zeolith while the other, loaded portion is blown with dried air. This system is particularly useful, when the hydrogen is used for the continuous operation of a fuel cell battery.

In the selection of the construction materials for the various components of the composite apparatus of the invention, it is recommended that only such materials be used, which are corrosion resistant under the temperature and pressure conditions of the operation of the equipment in contact with the various chemicals and compounds occuring in the process. The decomposition chamber for the peroxy compounds and all the surfaces of the equipment being directly contacted by the oxygen in statu nascendi are resistant thereto. Austenitic steels fulfill this condition and provides excellent construction materials for these parts of the apparatus. On the other hand, all those parts of the apparatus being contacted by the hydrogen in statu nascendi, especially the interior walls of the converter, are constructed from a material which is resistant thereto. Steel plating of the interior walls of the converter, especially with austenitic chromenickel steels, was found satisfactory. As is apparent, the outer surfaces and surface areas of the evaporator tube, of the converter and of the hydrogen diffuser are made from a material which is especially resistant to oxygen in statu nascendi, when these devices are incorporated in the interior of the peroxy decomposition chamber.

Many widely differing embodiments of this invention may be made without departing from the gist thereof. Accordingly, the invention is not limited to the specific embodiments shown herein except as defined in the appended claims.

We claim:

1. A process for the simultaneous production of hydrogen gas and oxygen gas which comprises supplying to and contacting in a reactor a measured, controlled volume of an aqueous solution of an oxygen-generating compound with a catalyst for decomposing the oxygen-generating compound, catalytically decomposing said oxygen-generating compound with the catalyst, generating oxygen gas and water, concurrently therewith releasing heat, within said reactor, and removing the oxygen gas from said reactor, supplying separately from said oxygen-generating compound a measured, controlled volume of an hydrogen-containing compound in water to said reactor, heating said hydrogen-containing compound with heat released by the decomposition of the oxygen-generating compound, contacting said preheated hydrogen-containing compound in said reactor with a catalyst heated by heat released by the decomposition of the oxygen-generating compound for decomposing the hydrogen-containing compound, catalytically decomposing said hydrogen-containing compound with said catalyst, generating a gas mixture containing hydrogen gas, feeding said gas mixture to a hydrogen diffusing chamber, selectively separating therein the hydrogen from the gas mixture, and removing said hydrogen from said reactor as separately from the oxygen removed from said reactor.

2. The process of claim 1 in which the diffuser comprises a palladium alloy.

3. The process of claim 1 in which the catalyst for the hydrogen-generating compound is at least one of the following: nickel chromite and copper chromite.

4. The process of claim 1 in which the catalyst for the decomposition of the oxygen-generating compound comprises an oxide of manganese.

5. The process of claim 1 in which essentially all of the heat required for the decomposition of the hydrogen-generating compound is provided by the exothermic decomposition of the oxygen-releasing compound.

6. The process of claim 1 in which the ratio of hydrogen to oxygen gas produced is 2 to 1.

7. The process of claim 1 wherein the oxygen-generating compound is hydrogen peroxide and its alkaline or alkaline earth salts.

8. The process of claim 1 wherein the hydrogen-generating compound is liquid or a gas.

9. The process of claim 1 wherein the temperature of reaction is in the range of 80° C. to 1,000° C.

10. The process of claim 1 wherein the temperature of reaction is in the range of 100° C. to about 600° C.

11. The process of claim 1 wherein the separated hydrogen is fed to a fuel cell for combustion as a fuel therein.

12. The process of claim 1 wherein the separated oxygen is fed to a fuel cell for reaction therein.

13. The process of claim 1 wherein the separated hydrogen and oxygen gases are fed to a fuel cell for reaction therein.

14. The process of claim 1 in which the vaporization of the inflow of the aqueous hydrogen-releasing compound is carried out by means of the combustion of the hydrogen gas in the produced gas mixture.